Patented Jan. 29, 1952

2,584,081

UNITED STATES PATENT OFFICE 2,584,081

DISULFIDE COMPOUNDS

Anthony H. Land, Ridley Park, Pa., assignor to Sharp & Dohme, Incorporated, Philadelphia, Pa., a corporation of Maryland No Drawing. Original application October 10, 1947, Serial No. 779,212. Divided and this application March 15, 1951, Serial No. 215,864

1 Claim. (Cl. 260—306.8)

This invention relates to new thiazole derivatives, and in particular, to di-(2-amino-4-thiazolylmethyl)-disulfide.

The compound of the invention is useful as an intermediate for the preparation of other compounds which may indicate varied application in therapeutic preparations, such as anti-thyroid agents.

The compound of the invention is most conveniently prepared from the corresponding isothiourea salts, by treatment of the isothiourea compound with alkali, forming the mercaptan or mercaptide in solution, followed by treatment with hydrogen peroxide or other oxidizing agent.

The isothiourea salts which are used as intermediates for the preparation of the compound of the application may be conveniently prepared by direct reaction of the corresponding 4-chloromethylthiazole with thiourea in an inert solvent. This reaction proceeds readily and gives the isothiourea in the form of the hydrochloride directly. These isothioureas are not stable except in the form of their salts, decomposing under alkaline conditions to the mercaptan and cyanamide, and when they are used for the preparation of the products of this invention, isolation of the mercaptan is not necessary, all that is required being the treatment of the isothiourea salt solution with alkali to form the mercaptan, and the use of this solution for the production of the desired compound.

This method of preparing the new compound of the invention will be illustrated in the following example, but the invention is not limited thereto. All parts are by weight.

*Example 1.—Di-(2-amino-4-thiazolylmethyl)-disulfide*

13.05 parts of S-(2-amino-4-thiazolylmethyl)-isothiourea hydrochloride was dissolved in 80 parts of 10% sodium hydroxide solution. The solution was cooled to 10° C. and maintained at that temperature while 6% hydrogen peroxide solution was added dropwise with rapid stirring. The addition of peroxide was continued until a few drops of the reaction mixture no longer gave a purple color with sodium nitroprusside solution. The solid was collected on a filter, washed with water and dried at 70° C. The crude product, M. P. 158–162° C., was crystallized from 50% alcohol, giving the product in the form of white crystals melting at 165–166° C. Repetition of the recrystallization raised the melting point to 165.5–166.5° C.

This application is a division of United States Patent Application Serial No. 779,212, filed by myself and James M. Sprague on October 10, 1947, now U. S. Patent 2,580,476.

What is claimed is:

The compound, di-(2-amino-4-thiazolylmethyl)-disulfide, having the formula

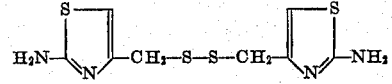

ANTHONY H. LAND.

REFERENCES CITED

The following references are of record in the file of this patent:

Sprague et al.: Jr. Am. Chem. Soc., vol. 68 (November 1946), pp. 2155–2159.